Figure 1:
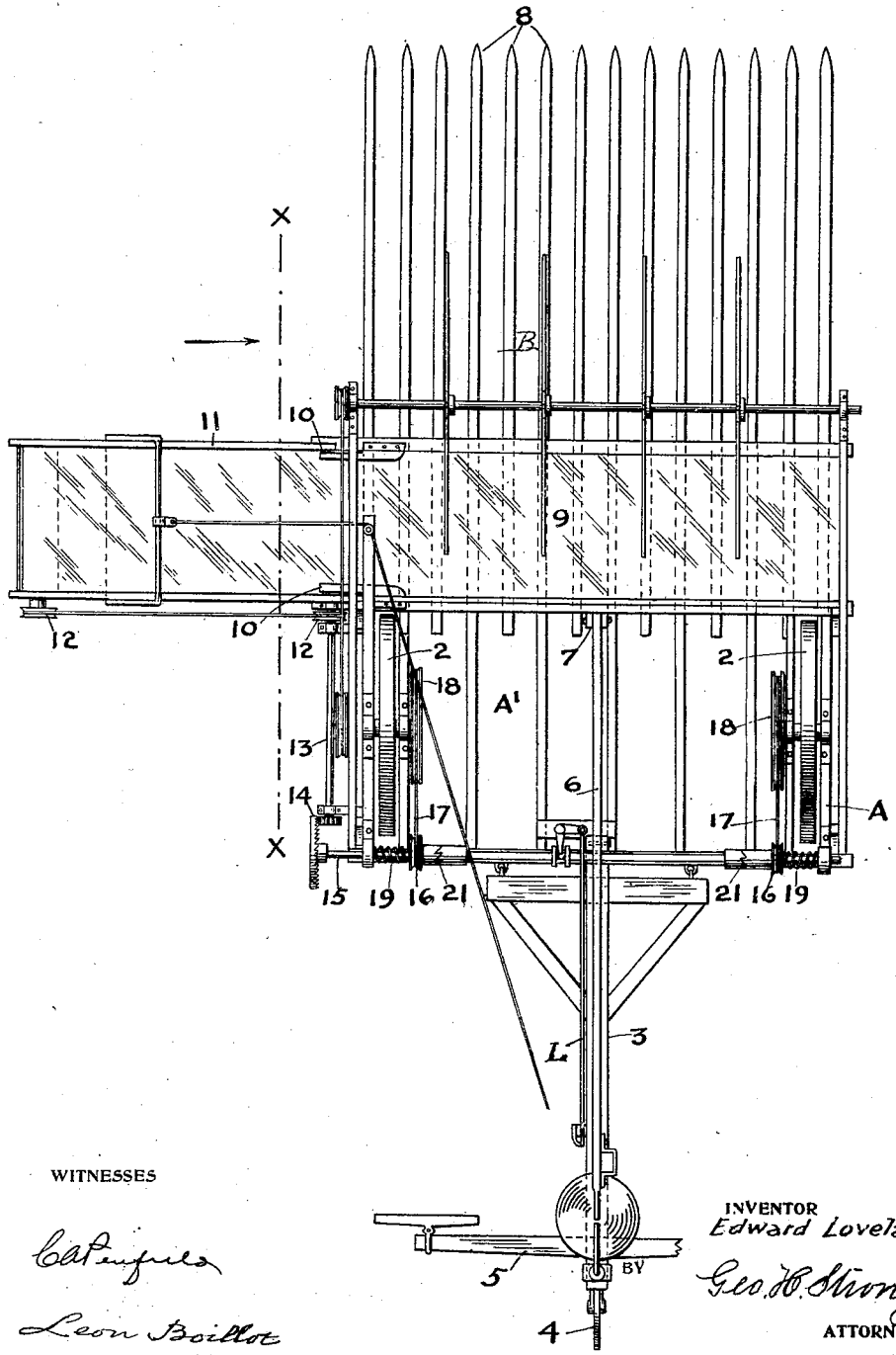

E. LOVELADY.
HAY GATHERER AND LOADER.
APPLICATION FILED JULY 14, 1908.

922,301.

Patented May 18, 1909.
2 SHEETS—SHEET 1.

WITNESSES
C A Penfield
Leon Boillot

INVENTOR
Edward Lovelady
BY
Geo. H. Strong
ATTORNEY

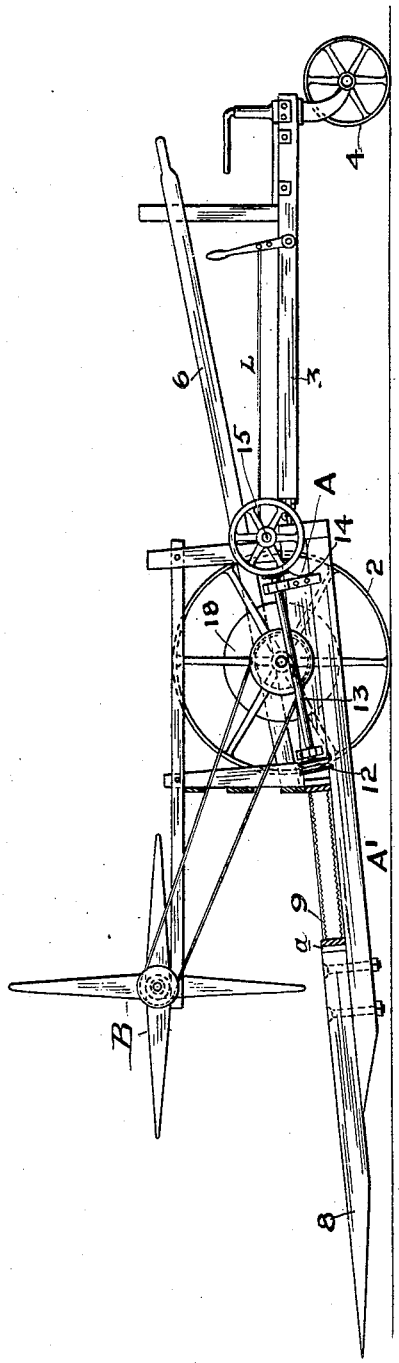

UNITED STATES PATENT OFFICE.

EDWARD LOVELADY, OF SALMON FALLS, OREGON.

HAY GATHERER AND LOADER.

No. 922,301.          Specification of Letters Patent.          Patented May 18, 1909.

Application filed July 14, 1908. Serial No. 443,406.

*To all whom it may concern:*

Be it known that I, EDWARD LOVELADY, citizen of the United States, residing at Salmon Falls, in the State of Oregon, have invented new and useful Improvements in Hay Gatherers and Loaders, of which the following is a specification.

My invention relates to an apparatus which is especially designed for gathering hay after it has been cut, and loading it upon wagons or vehicles for transporation.

It consists in the combination of parts, and in details of construction which will be more fully explained by reference to the accompanying drawings, in which—

Figure 1 is a plan of gatherer. Fig. 2 is a side elevation, sectioned on line $x$—$x$ of Fig. 1.

In the usual methods of gathering and transporting hay which has been cut and left lying broadcast upon the ground, various operations are needed to first collect it into windrows or heaps, and afterward to load it for transportation; these operations necessitating a considerable force of employees and a corresponding length of time to complete the work. In my invention I have provided a single traveling apparatus which is designed to gather the hay, and to automatically transfer it to the wagons or vehicles upon which it is to be carried away.

As shown in the accompanying drawings, A is a suitably constructed frame having bearing-wheels 2, a pole 3 extending from the rear of the frame to which its front end is hinged, a steering-wheel 4 swiveled at the rear of the pole, and a draft bar 5 for the attachment of a suitable team by which the machine may be propelled.

6 is a lever fulcrumed from the rear of the frame A as shown at 7, and having its front end pivoted to a portion of the frame intermediate between the rear and front so that by raising and lowering this lever, the main frame may be tilted upon its bearing-wheels to raise or depress the front as will be hereafter described. This portion of the apparatus is not essentially different from what is known as a "header" employed for gathering grain.

In my invention I have shown a series of long teeth 8 firmly fixed to the longitudinal and front cross timbers of the main frame. I have here shown the main longitudinal timbers A' as being extended to a considerable distance in front of the front cross timber $a$ of the main frame, and the teeth 8 are bolted to these extensions, the rear ends of the teeth abutting the said front cross timber of the main frame, and the front ends being gradually tapered and extending several feet to the front. These teeth are sufficiently close together to form an open platform capable of receiving and holding a body of hay which is gathered by causing the machine to be moved so that the teeth will, in passing over the ground, lift up the hay lying thereon, and deposit it upon the upper surfaces of the teeth 8. In this manner, a large body amounting to as much as 1500 lbs. of hay, may be collected and carried along for any required distance, so that if the wagons upon which the hay is to be loaded, are not present, the hay can be retained upon this portion of the machine until such time as the wagons are available.

In order to transfer the hay to the wagons, I have shown a transversely traveling belt or draper 9 passing over a suitable drum at the outer end, and between guides 10 where the belt turns and makes an upward angle of travel in the spout 11 which is hinged to the side of the main frame, and in the line of travel of the draper. A drum at the upper end of the spout serves to direct this portion of the endless belt so that it will travel continuously when properly driven; and the hay is moved from the fingers 8 upon the belt 9 by means of a reel B journaled at the front of the machine and above the rear ends of the fingers. This reel being revolved at pleasure so as to remove the hay from the fingers and deposit it upon the belt 9, which belt being caused to travel at the same time will carry the hay up through the spout 11 and deposit it upon a wagon or vehicle which is driven and caused to travel beneath the discharge end of the spout.

When the wagon is loaded and driven away, and between its leaving and the arrival of another wagon, the loading apparatus may be stopped while the machine continues and gathers the hay upon the fingers 8, as previously described. I am thus enabled to accurately control the handling of the hay without stopping the travel of the machine.

The draper or carrying belt may be driven in any suitable manner from the bearing-wheels 2 through the medium of pulleys 12, a shaft 13 and intermeshing beveled gearing 14. This gearing is driven from a shaft 15 journaled upon the rear portion of the frame A, and having pulleys 16 around which pass belts 17 from corresponding wheels 18 carried upon the journal-shafts of the bearing-wheels so that as the machine is propelled the power will be transmitted through the above named agencies to drive the carrying belt.

In order to control the movement of the belt and to arrest it at will, the shaft 15 is made slidable in its journal-boxes, and by means of a suitable lever L or equivalent mechanism, this shaft may be moved longitudinally until the bevel-gears 14 are disengaged, when the carrying-belt or draper will stop.

The gears are normally held in mesh by means of springs 19 acting between the journal-boxes of the shaft, and suitable collars or pulleys upon the shaft, so that the gears may normally be maintained in engagement by the action of the spring, and they may be thrown out of mesh by means, previously mentioned, by which the shaft is moved, and the springs compressed.

In order to allow the machine to turn freely, the bearing-wheels are journaled independently at each side of the frame. The shaft 15 is provided with suitable clutches 21 so disposed that when in turning the machine, one bearing-wheel will travel faster than the other, the clutches will yield so that while the shaft is continuously driven, it provides a differential movement which allows one wheel to be driven independent of and faster than the other.

Having thus described my invention, what I claim and desire to secure by Letters Patent is—

1. An apparatus for gathering hay, said apparatus comprising a wheeled frame, means for raising and lowering the front thereof, said frame having a cross timber and longitudinal timbers extending forwardly thereof, and supplemental fingers extending forwardly of said longitudinal timbers and having their rear ends abutting against said cross-timbers.

2. An apparatus for gathering and loading hay, said apparatus comprising a wheeled frame, means for raising and lowering the front thereof, longitudinal timbers fixed to the main frame and extending forwardly therefrom, fingers extending forwardly from the frame timber extensions and secured thereto, means on the main frame against which the rear ends of the fingers abut, a belt and means by which it is caused to travel transversely at the rear of the fingers, means for transferring the hay from the fingers to the belt, and means by which the travel of the belt may be maintained or arrested.

3. In an apparatus for gathering and loading hay, the combination of a main wheeled frame, means for steering and for tilting the frame about the wheel base, a platform consisting of longitudinal timbers fixed to the main frame and extending forwardly therefrom, supplemental tapering fingers extending forwardly from the main timber extensions and secured thereto, means forming an end abutment for said fingers, an endless transversely traveling belt contiguous to the rear ends of the fingers, a revoluble reel journaled above the fingers and adapted to transfer the hay therefrom to the belt, means by which the carrying belt is driven in unison with the movement of the bearing wheels, and mechanism by which the belt-driving means may be disengaged to arrest the movement of the belt.

4. An apparatus for gathering hay, said apparatus consisting of a main frame, independently journaled bearing-wheels at each side thereof, a rearwardly extending pole with steering-wheel, and means for connecting the power to advance the machine, longitudinal timbers fixed to the main frame, and extending forwardly therefrom, supplemental tapering fingers extending forwardly from the frame timber extensions and secured thereto, said fingers abutting against the front cross timber of the main frame, a transversely traveling belt, and a reel by which the hay may be transferred from the finger platform to the traveling belt.

In testimony whereof I have hereunto set my hand in presence of two subscribing witnesses.

EDWARD LOVELADY.

Witnesses:
  GEO. H. STRONG,
  CHARLES EDELMAN.